F. G. McMULLEN.
DRIVING MECHANISM FOR CREAM SEPARATORS.
APPLICATION FILED FEB. 9, 1910.

1,006,768.

Patented Oct. 24, 1911.

UNITED STATES PATENT OFFICE.

FREDERIC G. McMULLEN, OF WALTHAM, MASSACHUSETTS, ASSIGNOR, BY MESNE ASSIGNMENTS, TO HENRY N. FISHER, OF WALTHAM, MASSACHUSETTS.

DRIVING MECHANISM FOR CREAM-SEPARATORS.

1,006,768.

Specification of Letters Patent.

Patented Oct. 24, 1911.

Application filed February 9, 1910. Serial No. 542,950.

*To all whom it may concern:*

Be it known that I, FREDERIC G. McMULLEN, a citizen of the United States, and a resident of Waltham, in the county of Middlesex and State of Massachusetts, have invented a new and useful Improvement in Driving Mechanism for Cream-Separators, of which the following is a specification.

My invention relates to driving mechanism for the bowls of centrifugal cream separators, and its objects are to improve and simplify the construction of such mechanism in the manner hereinafter set forth.

My invention will be described in connection with the drawings which accompany and form a part of this specification in which—

Figure 1:
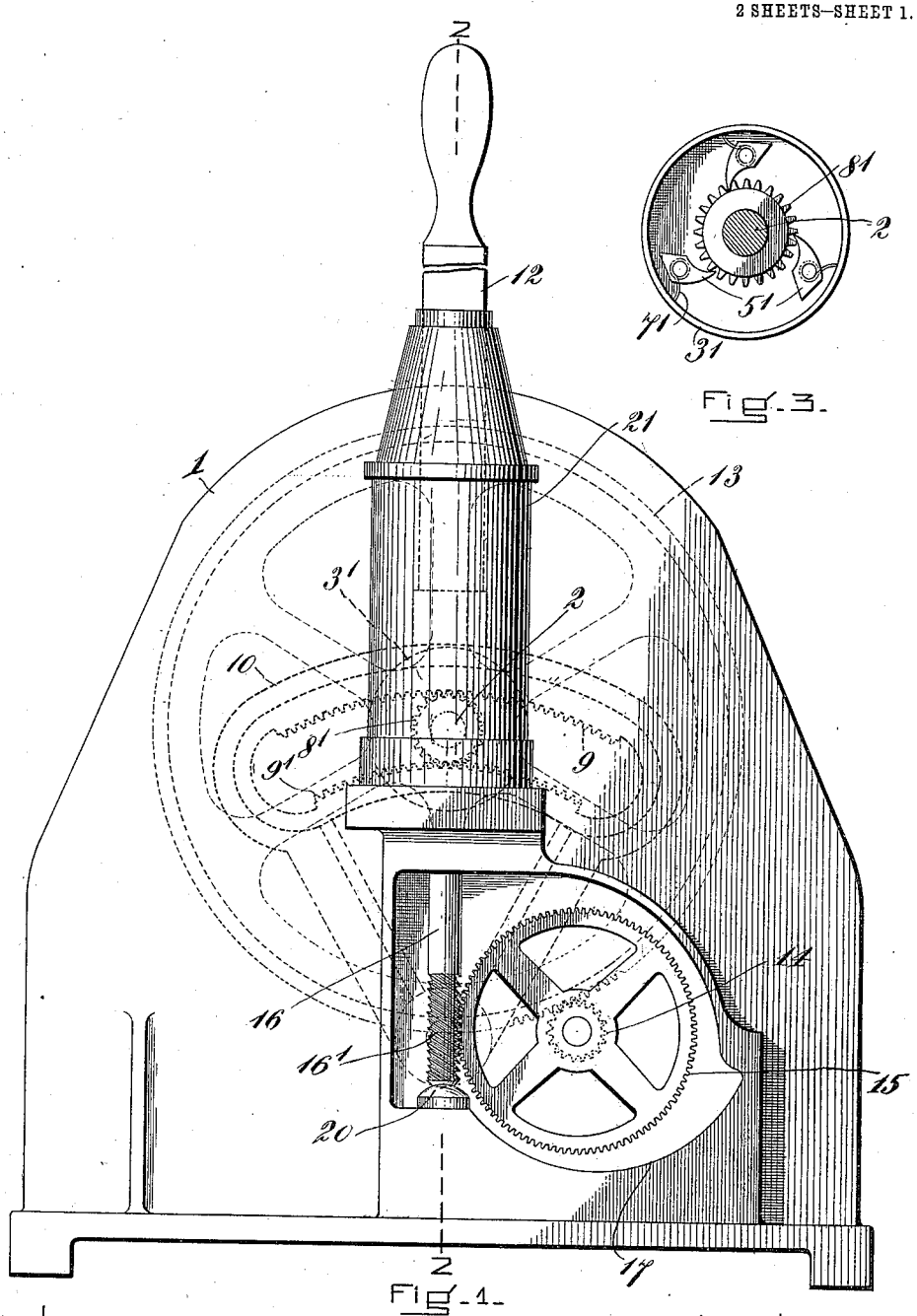
Figure 2:
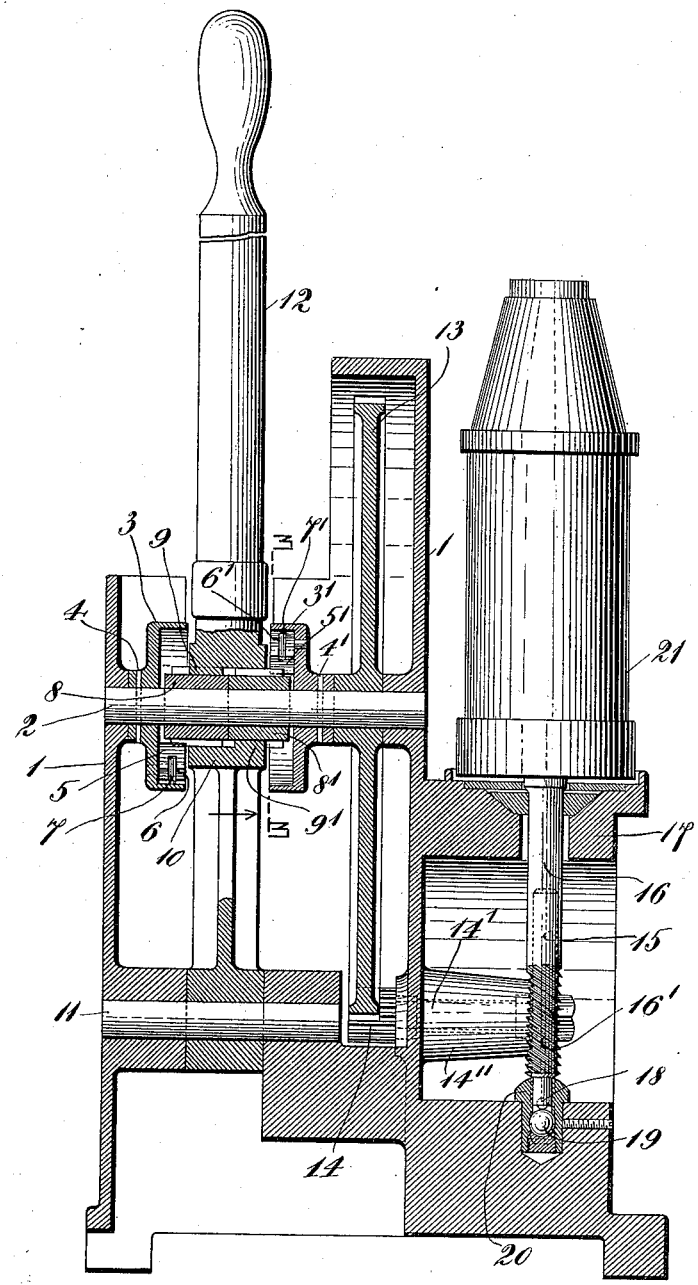

Figure 1 is a side view of my improved driving mechanism; Fig. 2 is a vertical section taken on the line 2—2 of Fig. 1, and Fig. 3 is a section of a detail of construction taken on the line 3—3 of Fig. 2.

In the particular embodiment of my invention selected for illustration, 1 is a frame open at the top and provided with bearings for the drive-shaft 2. The pinions 8 8' are mounted loosely on the drive-shaft and engage respectively the segmental racks 9, 9', the teeth of which as shown in Fig. 2, are off-set and located in different vertical planes. Rigidly secured to the drive-shaft 2 by the pins 4, 4' are suitable pawl-supporting members 3, 3' shown in the present instance as caps each inclosing one of the pinions and each carrying on its inner face one of the sets of pawls 5 5', each pawl being pressed into engagement with its pinion by a spring 7, 7' located in a slot 6, 6' in each pawl and bearing at its outer end against the cap.

The rack-frame 10 is fulcrumed on the shaft 11 and is provided with an upwardly-extending hand-operated lever 12 whereby it may be oscillated about the shaft 11.

When the lever is moved to the left of the position shown in Fig. 1, the upper rack 9 will rotate the pinion 8 in a counter-clockwise direction and said pinion, through the intermediary of the pawls 5 and cap or pawl-supporting member 3, will communicate its motion to the drive-shaft 2; while at the same time the lower rack 9' will rotate its pinion 8' in a clockwise direction and said pinion will run idle, its teeth slipping over the pawls 5'. When said lever is moved to the right of the position shown in Fig. 1, the lower rack 9' will rotate the pinion 8' in a counter-clockwise direction and said pinion, through the intermediary of the pawls 5' and the cap or pawl-supporting member 3', will communicate its motion to the drive-shaft 2; while at the same time the upper rack 9 will rotate the pinion 8 in a clockwise direction and said pinion will run idle, its teeth slipping over the pawls 5. In this manner the oscillation of the segmental racks about the shaft 11 will cause the drive-shaft 2 to rotate continuously in the same direction.

It will be noted that each set of pawls 5, 5' coöperates directly with the teeth of the pinions 8, 8' and that for this purpose the pinions are made wider than the teeth of the racks 9, 9' so that a portion of each pinion extends beyond its coöperating rack. By means of this construction I am enabled to obviate the necessity of employing ratchet teeth, such as have heretofore been used in apparatus of this character, for coöperating with the pawls. I have found that when ratchet teeth are so employed, the life of the apparatus is relatively short and its efficiency is greatly impaired by the tendency of the pawls to slip over the ratchet teeth. I have ascertained, however, that when the ratchet teeth are eliminated and the pawls coöperate directly with the deep-cut teeth of the pinions, there is absolutely no slipping of the pawls over the teeth (except of course when the pinions are running idle). Furthermore the cost of the apparatus is considerably reduced by eliminating a ratchet wheel, either secured to or made integral with the pinions. I have found it advisable to employ a plurality of pawls for engaging with the teeth of each pinion, and, as shown in Fig. 3, I prefer to so position the members of each set of pawls that one or more, but not all, the pawls engage the teeth at the same time.

A gear-wheel 13 of relatively large diameter is rigidly connected with the drive-shaft 2 and meshes with a pinion 14 of relatively small diameter, said pinion being integral with the shaft 14' running in the bearing 14", which may be formed integral with the frame. Journaled in the housing 17 is a vertically-extending load-carrying member shown in the present instance as the shaft 16 provided near its lower end with the spiral screw 16' which meshes with the helical gear 15 rigidly connected with the shaft 14'. Inasmuch as the shaft 16 is intended to be rotated at very high speed, I prefer to provide the lower end thereof with a ball-bearing consisting of a ball 18 held in a socket in the lower end of said shaft and contacting with the larger ball 19 which in turn is secured in the bearing socket 20.

The upper end of the load-carrying member 16 may be attached in any suitable manner to the bowl of a centrifugal cream separator.

Inasmuch as the gear-wheels 13 and 15 are vertically disposed, it is not necessary to have the same absolutely balanced about their center lines, whereas I have ascertained that if one or both of said rapidly-rotating gear-wheels are horizontally disposed, as has been the case heretofore, a very slight inequality in the balance thereof will result in severe strain in the apparatus.

By means of the driving mechanism above described an unskilled operator may with very little effort secure a constant and uniform rotation of the bowl 21 of from eight thousand to nine thousand revolutions per minute on account of the practical impossibility of the forward slipping of the pawls over the pinions, so that every oscillation of the lever is effective, friction is reduced to a minimum and the apparatus may be subjected to hard usage, such as operation at excessively high speeds with impunity.

It will be understood that various modifications may be made in the specific apparatus above described without departing from the spirit of my invention.

I claim:

1. A driving mechanism for the bowl of a centrifugal cream separator comprising in combination, a frame, a pair of segmental racks fulcrumed to oscillate in said frame and having off-set teeth in different vertical planes, a drive-shaft journaled in said frame and passing between said racks, two pinions loosely mounted on said drive-shaft and each meshing with one of said racks, each pinion having a portion projecting beyond its coöperating rack, caps rigidly secured to said drive-shaft and each inclosing the projecting portion of one of said pinions, and a set of similarly-directed spring-pressed pawls secured to the inner face of each of said caps and each engaging the projecting portion of one of said pinions.

2. A driving mechanism for the bowl of a centrifugal cream separator comprising in combination, a frame, a pair of segmental racks fulcrumed to oscillate in said frame and having off-set teeth in different vertical planes, a drive-shaft journaled in said frame and passing between said racks, two pinions loosely mounted on said drive-shaft and each meshing with one of said racks, each pinion having a portion projecting beyond its coöperating rack, pawl-supporting members rigidly secured to said drive-shaft, and a set of similarly-directed spring-pressed pawls secured to each of said members and each engaging the projecting portion of one of said pinions.

3. A driving mechanism for the bowl of a centrifugal cream separator comprising in combination, a frame, a pair of segmental racks fulcrumed to oscillate in said frame and having off-set teeth in different vertical planes, a drive-shaft journaled in said frame and passing between said racks, two pinions loosely mounted on said drive-shaft and each meshing with one of said racks, each pinion having a portion projecting beyond its coöperating rack, caps rigidly secured to said drive-shaft and each inclosing the projecting portion of one of said pinions, a set of similarly directed spring-pressed pawls secured to the inner face of each of said caps and each engaging the projecting portion of one of said pinions, and a hand-operated oscillating lever secured to said racks.

4. A driving mechanism for the bowl of a centrifugal cream separator comprising in combination, a frame, a pair of segmental racks fulcrumed to oscillate in said frame, and having off-set teeth in different vertical planes, a drive-shaft journaled in said frame and passing between said racks, two pinions loosely mounted on said drive-shaft and each meshing with one of said racks, each pinion having a portion projecting beyond its coöperating rack, pawl-supporting members rigidly secured to said drive-shaft, a set of similarly-directed spring-pressed pawls secured to each of said members and each engaging the projecting portion of one of said pinions, and a hand-operated oscillating lever secured to said racks.

In testimony whereof, I have hereunto subscribed my name this 2nd day of Feb. 1910.

FREDERIC G. McMULLEN.

Witnesses:
Geo. K. Woodworth,
E. B. Tomlinson.

Copies of this patent may be obtained for five cents each, by addressing the "Commissioner of Patents, Washington, D. C."